United States Patent [19]
Myers

[11] Patent Number: 5,829,185
[45] Date of Patent: Nov. 3, 1998

[54] FISHING LURE HOLDING DEVICE

[76] Inventor: Dolphin Eugene Myers, 10699 Burkett Rd., Noble, Okla. 73068

[21] Appl. No.: 886,983

[22] Filed: Jul. 2, 1997

[51] Int. Cl.$^6$ .................................................. A01K 97/06
[52] U.S. Cl. ...................................... 43/57.1; 206/315.11
[58] Field of Search .................................. 43/54.1, 57.1; 206/315.11

[56] References Cited

U.S. PATENT DOCUMENTS

| | | | |
|---|---|---|---|
| 335,506 | 2/1886 | Conroy . | |
| 2,081,817 | 5/1937 | Johnson | 206/315.11 X |
| 2,364,807 | 12/1944 | Nelson, Jr. | 206/315.11 X |
| 2,927,395 | 3/1960 | Bartlett | 43/57.5 |
| 3,172,228 | 3/1965 | Freeman | 43/57.5 |
| 3,180,053 | 4/1965 | Norton et al. | 43/57.5 |
| 3,336,693 | 8/1967 | Lussier | 43/54.5 |
| 4,040,202 | 8/1977 | Wille | 43/57.5 |
| 4,631,856 | 12/1986 | Born | 43/57.1 |
| 4,958,730 | 9/1990 | Bunten | 206/315.11 |
| 5,606,820 | 3/1997 | Suddeth | 206/315.11 X |

*Primary Examiner*—Robert P. Swiatek
*Attorney, Agent, or Firm*—Joseph N. Breaux

[57] ABSTRACT

A fishing lure holding device that includes a device housing and a plurality of multiple lure eye gripping mechanisms secured to an upper surface of the device housing in a manner to form a number of eye receiving channels between adjacent lure eye gripping mechanisms, the eye receiving channels each being of sufficient size to receive therein the eyelet end of a fishing lure; the device housing having at least one hook barb receiving compartment formed therein and a plurality of elongated hook barb passage apertures formed through an upper surface thereof, the plurality of elongated hook barb passage apertures being arranged into multiple rows of elongated hook barb passage apertures, each of the multiple rows being aligned with one of the number of eye receiving channels, each of the plurality of elongated hook barb passage apertures being in connection with a hook barb receiving compartment; each of the multiple lure eye gripping mechanisms including a spring biased eye locking pin that extends into the eye receiving channel a distance sufficient to engage the eyelet end of a fishing lure.

18 Claims, 2 Drawing Sheets

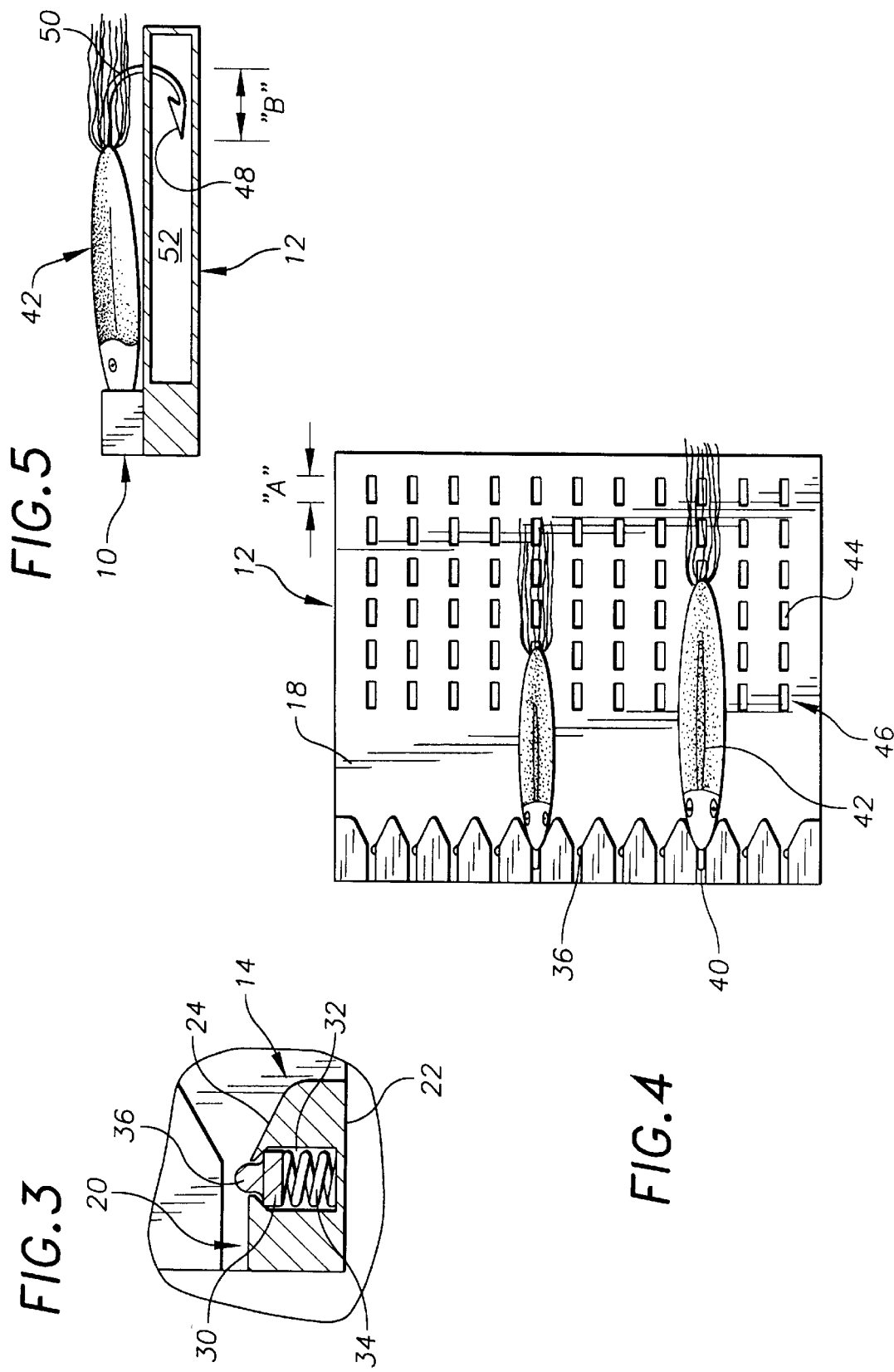

FISHING LURE HOLDING DEVICE

TECHNICAL FIELD

The present invention relates to storage devices and more particularly to a fishing lure holding device for holding multiple fishing lures in a convenient format that includes a device housing and a plurality of multiple lure eye gripping mechanisms secured to an upper surface of the device housing in a manner to form a number of eye receiving channel between adjacent lure eye gripping mechanisms that are of sufficient size to receive therein the eyelet end of a fishing lure; and wherein the device housing has a common hook barb receiving compartment formed therein and is provided with a plurality of elongated hook barb passage apertures formed through an upper surface thereof, the plurality of elongated hook barb passage apertures being arranged into multiple rows of elongated hook barb passage apertures, each of the multiple rows being aligned with one of the number of eye receiving channels, each of the plurality of elongated hook barb passage apertures being in connection with the common hook barb receiving compartment; and each of the multiple lure eye gripping mechanisms includes a spring biased eye locking pin that extends into the eye receiving channel a distance sufficient to engage the eyelet end of a fishing lure.

BACKGROUND OF INVENTION

Maintaining a number of fishing lures in a convenient readily accessible manner can be difficult. It would be a benefit, therefore, to have a fishing lure holding device that included structures for holding a number of fishing lures in an organized and readily accessible manner. Because fishing lures can be damaged when stored together, it would also be a benefit to have a fishing lure storage device that allowed the barbed portion of the fishing lure fish hook to be shielded within a housing to prevent injury to the fisherman as well as cosmetic damage to the other fishing lures. In addition, because fishing lures are produced in a variety of lengths, it would be a further benefit to have a fishing lure holding device that could be used to store and hold fishing lures of a number of lengths without requiring any modifications.

SUMMARY OF INVENTION

It is thus an object of the invention to provide a fishing lure holding device that includes structures for holding a number of fishing lures in an organized and readily accessible manner.

It is a further object of the invention to provide a fishing lure holding device that includes a housing within which the barbed portion of the fishing lure fish hook is shielded.

It is a still further object of the invention to provide a fishing lure holding device that can store and hold fishing lures of a number of lengths without requiring any modifications.

It is a still further object of the invention to provide a fishing lure holding device that includes a device housing and a plurality of multiple lure eye gripping mechanisms secured to an upper surface of the device housing in a manner to form a number of eye receiving channels between adjacent lure eye gripping mechanisms, the eye receiving channels each being of sufficient size to receive therein the eyelet end of a fishing lure; the device housing having at least one hook barb receiving compartment formed therein and a plurality of elongated hook barb passage apertures formed through an upper surface thereof, the plurality of elongated hook barb passage apertures being arranged into multiple rows of elongated hook barb passage apertures, each of the multiple rows being aligned with one of the number of eye receiving channels, each of the plurality of elongated hook barb passage apertures being in connection with a hook barb receiving compartment; each of the multiple lure eye gripping mechanisms including a spring biased eye locking pin that extends into the eye receiving channel a distance sufficient to engage the eyelet end of a fishing lure.

It is a still further object of the invention to provide a fishing lure holding device that accomplishes all or some of the above objects in combination.

Accordingly, a fishing lure holding device is provided. The fishing lure holding device that includes a device housing and a plurality of multiple lure eye gripping mechanisms secured to an upper surface of the device housing in a manner to form a number of eye receiving channels between adjacent lure eye gripping mechanisms, the eye receiving channels each being of sufficient size to receive therein the eyelet end of a fishing lure; the device housing having at least one hook barb receiving compartment formed therein and a plurality of elongated hook barb passage apertures formed through an upper surface thereof, the plurality of elongated hook barb passage apertures being arranged into multiple rows of elongated hook barb passage apertures, each of the multiple rows being aligned with one of the number of eye receiving channels, each of the plurality of elongated hook barb passage apertures being in connection with a hook barb receiving compartment; each of the multiple lure eye gripping mechanisms including a spring biased eye locking pin that extends into the eye receiving channel a distance sufficient to engage the eyelet end of a fishing lure. In a preferred embodiment, the multiple rows are oriented in parallel.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 3 is a cross-sectional view of one of the lure eye gripping mechanisms with the top surface removed from the gripping mechanism housing to show the eye locking pin slidably disposed within the spring channel formed within the gripping mechanism housing, and a top view of the eye receiving channel formed between adjacent lure eye gripping mechanisms.

FIG. 4 is a top plan view of the fishing lure holding device of FIG. 1 with the barbed end of each of the two representative fishing lure hooks positioned through a hook barb receiving aperture and the eye of each of the fishing lures installed within an eye receiving channel and locked in place by a spring biased eye locking pin.

FIG. 5 is a side partial cross sectional view of the fishing lure holding device of FIG. 1 along the line II—II showing the barbed end of a representative lure hook positioned through one of the hook barb receiving apertures into the common hook barb compartment formed within the device housing and the eye of the lure installed within the eye receiving channel.

Exemplary Embodiments

Figure 2:
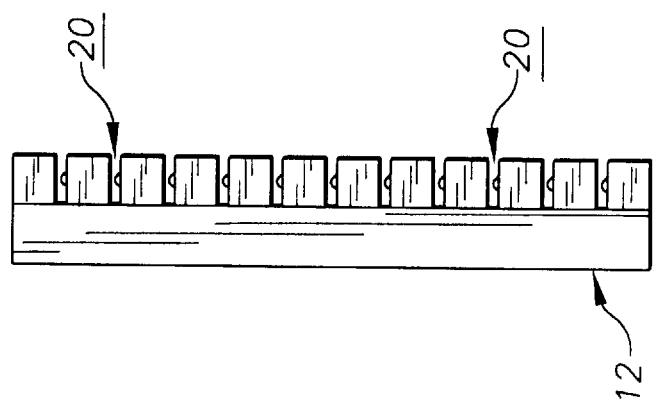
FIG. 2 is a side plan view of the fishing lure holding device of FIG. 1 along the line I—I showing the spring biased eye locking pins extending out into the eye receiving channel formed between adjacent lure eye gripping mechanisms.
Figure 1:
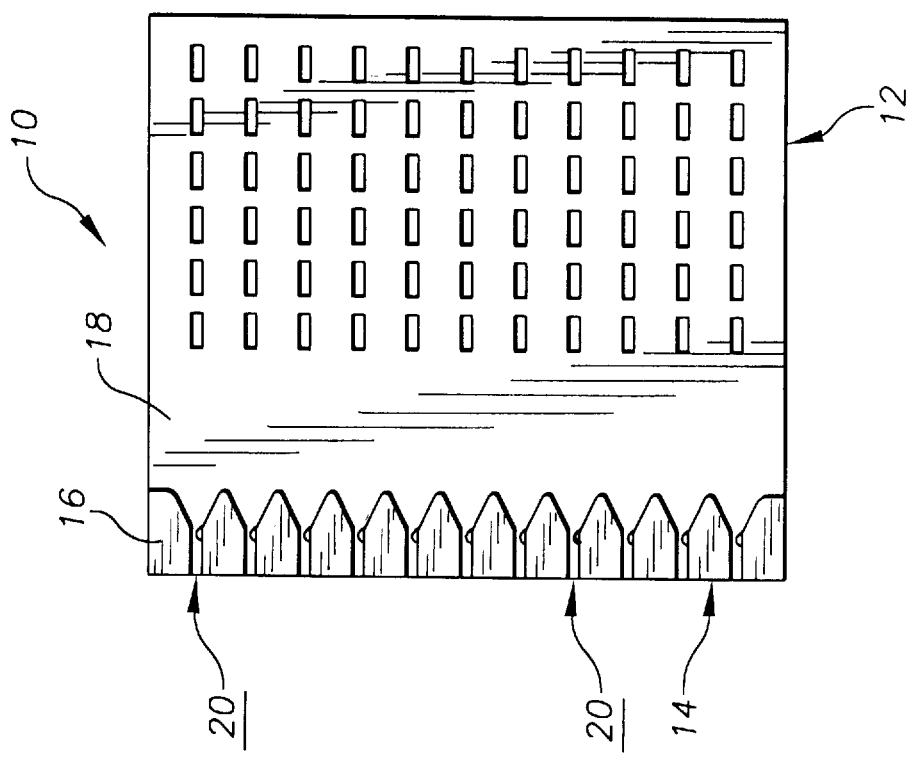
FIG. 1 is a top plan view of the fishing lure holding device of the present invention showing the device housing including the multiple rows of hook barb receiving apertures and the multiple lure eye gripping mechanisms secured to the device housing at the end of each of the rows of hook barb receiving apertures.

FIG. 1 shows an exemplary embodiment of the fishing lure holding device of the present invention generally designated by the numeral 10. In this embodiment, fishing lure holding device 10 includes a molded plastic device housing, generally designated 12; eleven lure eye gripping mechanisms, generally designated 14; and one channel forming member 16. In this embodiment, the eleven lure eye gripping mechanisms 14 and the one channel forming member 16 are adhesively secured to a planar upper surface 18 of molded plastic device housing 12, with reference now to FIG. 2, in a manner to form eleven eye receiving channels 20 that are sized to receive the eyelet end of a fishing lure.

With reference now to FIG. 3, each lure eye gripping mechanism 14 includes a molded plastic body member 22 having a beveled forward face 24 for guiding the eyelet end of a fishing lure into the eye receiving channel 20; and an eye locking pin 30 that is slidably entrapped within a cylindrical shaped spring channel 32 formed within molded plastic body member 22. A steel helical spring 34 is positioned within spring channel 32 and biases the semi-spherical tip 36 of eye locking pin 30 into eye receiving channel 20. Using a semi-spherical tip 36 at the end of eye locking pin 30 aids insertion of the eyelet end of a fishing lure into eye receiving channel 20. With reference to FIG. 4, in use, the semi-spherical tip 36 of eye locking pin 30 (FIG. 3) pops into the opening of the fishing lure eyelet 40 that is provided for securing the fishing lure, generally designated 42, to a fishing line.

In this exemplary embodiment, molded plastic device housing 12 as sixty-six elongated hook barb passage apertures 44 formed through its upper surface 18. The sixty-six elongated hook barb passage apertures 44 are arranged into eleven parallel oriented rows, generally designated 46, of elongated hook barb passage apertures 44 that are aligned with an eye receiving channel 20.

Elongated apertures 44 are of a length "A" that is shorter, with reference now to FIG. 5, than the length "B" of the barbed end 48 of the lure hook 50. Length "A" is preferably between one-quarter inch and one inch. In this embodiment, molded device housing 12 has a single common hook barb receiving compartment 52 that is accessible through any of the elongated hook barb passage apertures 44 (FIG. 4). In use, a lure 42 is secured to fishing lure holding device 10 by inserting the barbed end 48 of the lure hook 50 into the single common hook barb receiving compartment 52 through a user selected elongated hook barb passage aperture 44 (FIG. 4).

With reference back to FIG. 4, the elongated hook barb passage aperture 44 is selected in a manner such that the eyelet 40 of fishing lure 42 is positionable into the eye receiving channel 20 that is oriented in line with the row 46 that includes the selected elongated hook barb passage aperture 44 and the semi-spherical tip 36 of eye locking pin 30 (FIG. 3) pops into the opening of the fishing lure eyelet 40.

It can be seen from the preceding description that a fishing lure holding device has been provided that includes structures for holding a number of fishing lures in an organized and readily accessible manner; that includes a housing within which the barbed portion of the fishing lure fish hook is shielded; that can store and hold fishing lures of a number of lengths without requiring any modifications; and that includes a device housing and a plurality of multiple Lure eye gripping mechanisms secured to an upper surface of the device housing in a manner to form a number of eye receiving channels between adjacent lure eye gripping mechanisms, the eye receiving channels each being of sufficient size to receive therein the eyelet end of a fishing lure; the device housing having at least one hook barb receiving compartment formed therein and a plurality of elongated hook barb passage apertures formed through an upper surface thereof, the plurality of elongated hook barb passage apertures being arranged into multiple rows of elongated hook barb passage apertures, each of the multiple rows being aligned with one of the number of eye receiving channels, each of the plurality of elongated hook barb passage apertures being in connection with a hook barb receiving compartment; each of the multiple lure eye gripping mechanisms including a spring biased eye locking pin that extends into the eye receiving channel a distance sufficient to engage the eyelet end of a fishing lure.

It is noted that the embodiment of the fishing lure holding device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fishing lure holding device comprising:

a device housing; and a plurality of multiple lure eye gripping mechanisms secured to an upper surface of said device housing in a manner to form a number of eye receiving channels between adjacent lure eye gripping mechanisms, said eye receiving channels each being of sufficient size to receive therein said eyelet end of a fishing lure;

said device housing having at least one hook barb receiving compartment formed therein and a plurality of elongated hook barb passage apertures formed through an upper surface thereof, said plurality of elongated hook barb passage apertures being arranged into multiple rows of elongated hook barb passage apertures, each of said multiple rows being aligned with one of said number of eye receiving channels, each of said plurality of elongated hook barb passage apertures being in connection with a hook barb receiving compartment;

each of said multiple lure eye gripping mechanisms including a spring biased eye locking pin that extends into said eye receiving channel a distance sufficient to engage said eyelet end of a fishing lure.

2. The fishing lure holding device of claim 1, wherein:

said spring biased eye locking pin of each of said multiple lure eye gripping mechanisms includes a semi-spherically shaped tip that extends into a respective one of said eye receiving channels a distance sufficient to engage said eyelet end of a fishing lure.

3. The fishing lure holding device of claim 2, wherein:

each of said elongated hook barb passage apertures has a longest length "A" measuring between one-quarter of an inch and one-inch.

4. The fishing lure holding device of claim 3 wherein:

said multiple rows are oriented in parallel with each other.

5. The fishing lure holding device of claim 4 further including:

one channel forming member, and wherein:

one of said eye receiving channels is formed between one of said multiple lure eye gripping mechanisms and said channel forming member.

6. The fishing lure holding device of claim 5 wherein:

said device housing has only one hook barb receiving compartment formed therein; and each of said plurality of elongated hook barb passage apertures is in connection with said only one hook barb receiving compartment.

7. The fishing lure holding device of claim 2, wherein:

said multiple rows are oriented in parallel with each other.

8. The fishing lure holding device of claim 2 further including:

one channel forming member, and wherein:

one of said eye receiving channels is formed between one of said multiple lure eye gripping mechanisms and said channel forming member.

9. The fishing lure holding device of claim 2 wherein:

said device housing has only one hook barb receiving compartment formed therein; and each of said plurality of elongated hook barb passage apertures is in connection with said only one hook barb receiving compartment.

10. The fishing lure device of claim 1, wherein:

each of said elongated hook barb passage apertures has a longest length "A" measuring between one-quarter of an inch and one-inch.

11. The fishing lure holding device of claim 10 wherein:

said multiple rows are oriented in parallel with each other.

12. The fishing lure holding device of claim 11 further including:

one channel forming member, and wherein:

one of said eye receiving channels is formed between one of said multiple lure eye gripping mechanisms and said channel forming member.

13. The fishing lure holding device of claim 12 wherein:

said device housing has only one hook barb receiving compartment formed therein; and each of said plurality of elongated hook barb passage apertures is in connection with said only one hook barb receiving compartment.

14. The fishing lure holding device of claim 10 urther including:

one channel forming member, and wherein:

one of said eye receiving channels is formed between one of said multiple lure eye gripping mechanisms and said channel forming member.

15. The fishing lure holding device of claim 10 wherein:

said device housing has only one hook barb receiving compartment formed therein; and each of said plurality of elongated hook barb passage apertures is in connection with said only one hook barb receiving compartment.

16. The fishing lure holding device of claim 1 wherein:

said multiple rows are oriented in parallel with each other.

17. The fishing lure holding device of claim 1 further including:

one channel forming member, and wherein:

one of said eye receiving channels is formed between one of said multiple lure eye gripping mechanisms and said channel forming member.

18. The fishing lure holding device of claim 1 wherein:

said device housing has only one hook barb receiving compartment formed therein; and each of said plurality of elongated hook barb passage apertures is in connection with said only one hook barb receiving compartment.

\* \* \* \* \*